United States Patent [19]
Bertz et al.

[11] Patent Number: 5,116,234
[45] Date of Patent: May 26, 1992

[54] MEASURING ARRANGEMENT FOR ROTATIONALLY SYMMETRICAL WORKPIECES

[75] Inventors: Hans-Ulrich Bertz, Kuppenheim; Willi Meder, Ettlingen-Bruchhausen, both of Fed. Rep. of Germany

[73] Assignee: Dr.-Ing. Hofler Messgeratebau GmbH, Fed. Rep. of Germany

[21] Appl. No.: 755,295

[22] Filed: Sep. 5, 1991

[30] Foreign Application Priority Data

Sep. 5, 1990 [DE] Fed. Rep. of Germany ....... 4028076

[51] Int. Cl.⁵ .............................................. G01B 7/28
[52] U.S. Cl. ........................................ 33/550; 33/552; 33/555; 33/557; 33/783
[58] Field of Search ................. 33/549, 550, 551, 552, 33/553, 554, 555, 557, 572, 783, 805, 806, 545, 546, 555.1, 558.2, 560

[56] References Cited

U.S. PATENT DOCUMENTS

| | | |
|---|---|---|
| 1,480,611 | 1/1924 | Hill ................................ 33/549 |
| 1,567,005 | 12/1925 | Gulick ............................ 33/549 |
| 3,102,344 | 9/1963 | Herman .......................... 33/557 |
| 3,130,501 | 4/1964 | Houldsworth .................. 33/783 |
| 3,264,741 | 8/1966 | Brebant .......................... 33/549 |
| 3,869,800 | 3/1975 | Bartlett et al. ................. 33/545 |
| 4,064,633 | 12/1977 | Wertepny ...................... 33/550 |
| 4,313,263 | 2/1982 | McMurtry . | |
| 4,531,294 | 6/1985 | Lenz .............................. 33/550 |
| 4,674,193 | 6/1987 | Wertrpny et al. ............. 33/550 |
| 4,680,865 | 7/1987 | Danielli et al. ................ 33/549 |
| 4,811,524 | 3/1989 | Corallo .......................... 33/783 |

FOREIGN PATENT DOCUMENTS

| | | |
|---|---|---|
| 0317967 | 11/1988 | European Pat. Off. . |
| 3733814 | 4/1989 | Fed. Rep. of Germany ..... 33/555.1 |
| 0403439 | 1/1946 | Italy .................................. 33/555 |
| 0135711 | 6/1987 | Japan ............................... 33/555.1 |
| 1231383 | 5/1986 | U.S.S.R. ........................... 33/546 |

OTHER PUBLICATIONS

B. Ferrara; In-Process Messen, steuern und regeln; Industrie Anzeiger; Mar. 1984; pp. 101-103.

Primary Examiner—Thomas B. Will
Attorney, Agent, or Firm—Willian, Brinks, Olds, Hofer, Gilson & Lione

[57] ABSTRACT

There is specified a measuring arrangement for rotationally symmetrical workpieces with an adjustable clamping device which carriers the workpiece, and with a movable measuring slide which carries at least one measuring head which measures the workpiece with a sensing pin in a radial direction or an axial direction or both, as the disadvantage is avoided that with a change of the measuring assignment another sensing pin adapted to the new measuring assignment must be re-outfitted in a complicated manner. To accomplish this task the measuring head is equipped with a sensing pin carrier that carries several sensing pins and is turnable. Thus, the sensing pins can be turned rapidly into the measuring position. There they are held fast by a stopping device.

15 Claims, 3 Drawing Sheets

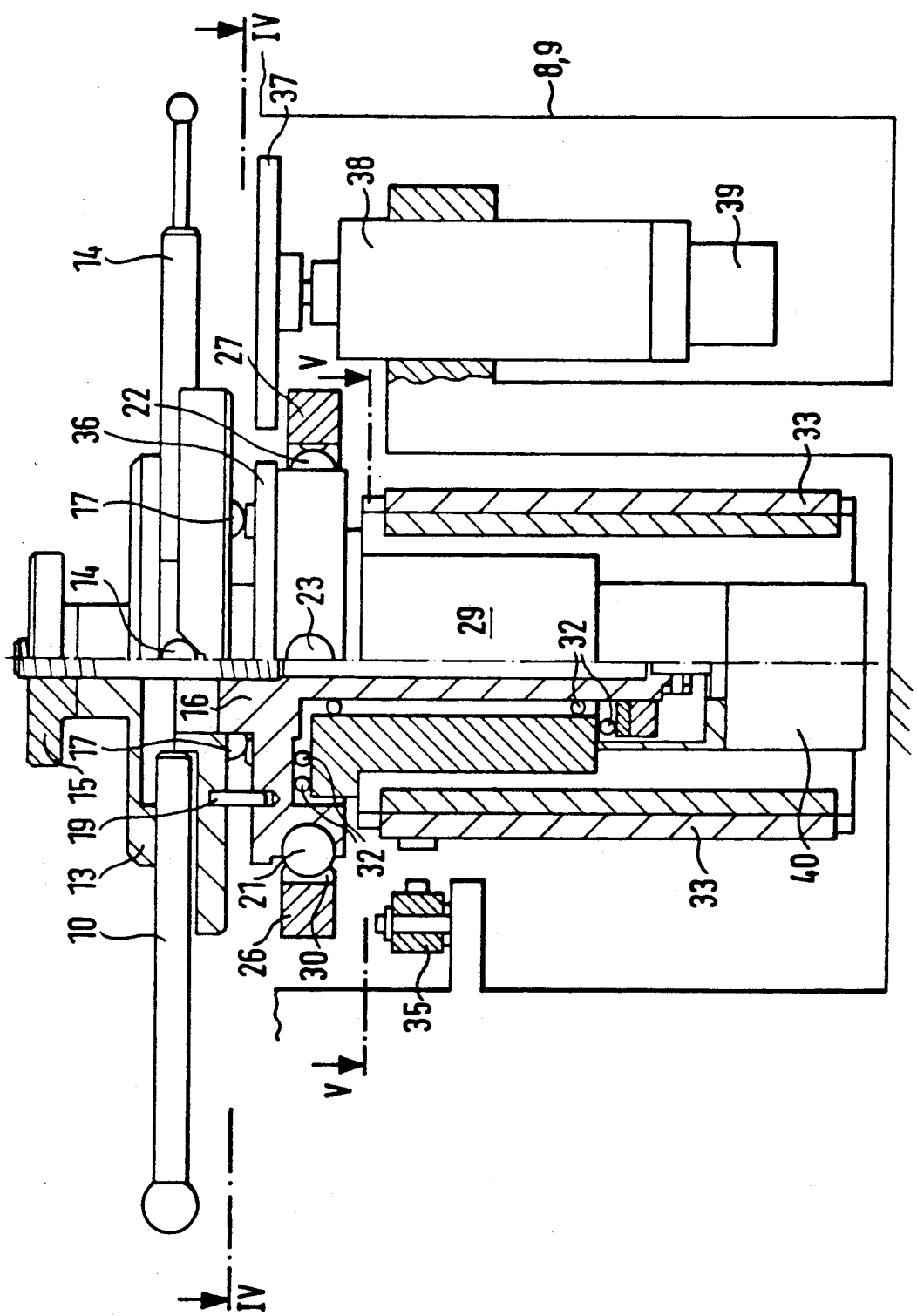

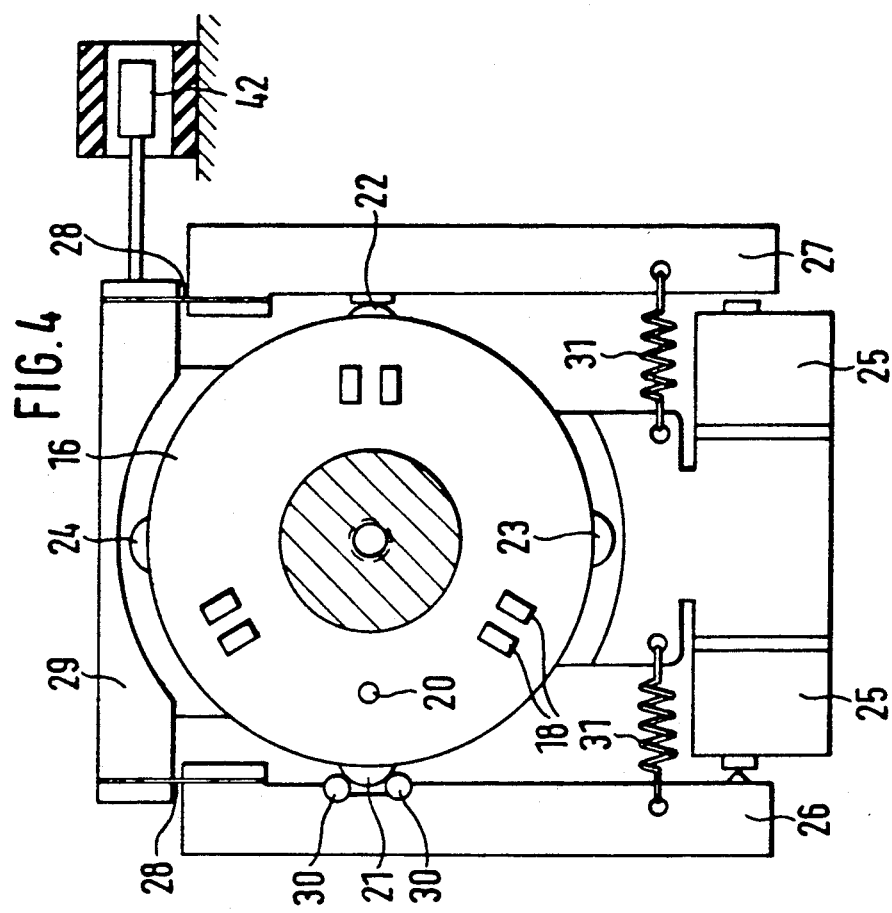
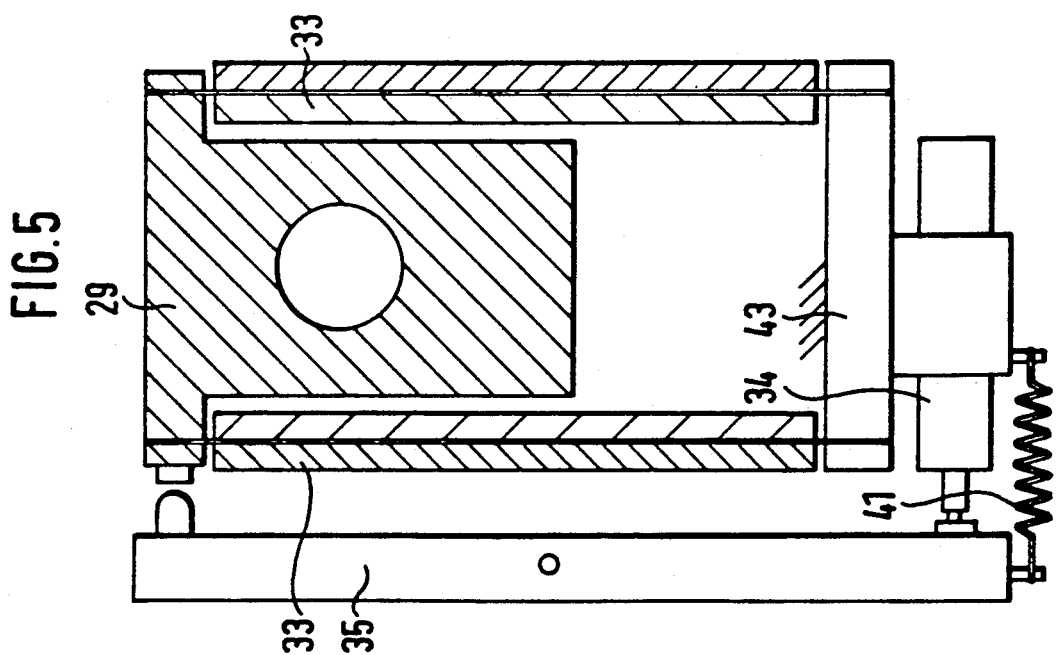

MEASURING ARRANGEMENT FOR ROTATIONALLY SYMMETRICAL WORKPIECES

BACKGROUND

The invention relates to a measuring arrangement for rotationally symmetrical workpieces with longitudinal guides running in an axial direction of the workpiece and on which a measuring slide is movable, which carries at least one measuring head measuring the workpiece with a sensing pin in radial and/or axial direction, in which system the measuring head is movable transversely to the longitudinal guides on the measuring slide and in which the sensing pin is coupled over a spring element to the measuring head in such a way that it is movable at least in the radial direction with respect to the workpiece out of a basic position, in which on the spring part there is fastened at least one measurement value indicator, with which the position change of the sensing pin is detectable.

Measuring arrangements of this type are known. In them the workpieces are held either rigidly by a clamping prism or they are turnably borne between tail stocks with adjustable tail spindles.

These arrangements have the substantial disadvantage that on a change of the measuring assignment, under in part considerable manual expenditure, another sensing pin or measuring head must be mounted. Thereby a measuring of a workpiece with respect to several measuring magnitudes becomes very complicated and time-consuming.

The problem of the invention, therefore, is to specify a measuring apparatus with which a rapid change of different measuring sensors is possible, which are optimally suited for different measuring assignments.

There the change between the individual measuring sensors is to be rapid and possible without high assembling expenditure; furthermore it is to be simple to operate and economical.

The problem is solved according to the invention by the means that the sensing pin is arranged in a measuring pin carrier with at least two sensing pins, that the sensing pin carrier is arranged to turn about an axis perpendicular to the workpiece axis and in a plane that contains the workpiece axis, and that the sensing pin carrier is stoppable in each case in a rotary position allocated to the individual sensing pins.

The invention has the advantage that one measuring head is suited for several measuring assignments, so that a cost-intensive stocking of the most diverse measuring heads is eliminated. By the formation according to the invention of such a measuring head, in the case of another measuring assignment no other measuring head has to be mounted on the measuring apparatus, but it suffices to turn the sensing pin so that a suitable sensing pin is brought into the measuring position. As the sensing pin carrier is stoppable in individual rotary positions allocated to sensing pins, a high user-friendliness is achieved, since a time-consuming adjustment of the rotary position is eliminated such as would arise in an electrical position apparatus of the type often used.

In order to further improve the flexibility of the measuring arrangement it is advantageous to connect the sensing pin carrier changeably with the measuring head.

If there the sensing pin carrier is fastened with a clamping device to a rotary body which is turnably borne in the measuring head, then it is hereby avoided that in the changing of the sensing pin carrier the high-precision, play-free bearings required for its turning must be solved. The fastening of the sensing pin carrier to the rotary body must in this context be regarded as less critical.

The clamping arrangement with which the sensing pin carrier is fastened to the rotary body can be, for example, a clamping screw or a clamping lever. It is also thinkable, however, to provide on the rotary body a motor with a spindle which connects the sensing pin carrier over a thread with the rotary body. On the other hand, also an electromagnet or permanent magnet or a pneumatic suction device can be integrated into the rotary body, with which the connection is brought about between sensing pin carrier and rotary body.

In all these clamping arrangements it is favorable if the rotary body has a bearing, especially a three-point bearing, which clearly determines the position of the fastened sensing pin carrier to the rotary body. In a preferred embodiment this three-point bearing is formed by three cylindrical body pairs on the rotary body and three spherical cups corresponding with this on the sensing pin carrier. In order here to exactly define the angular position, the sensing pin carrier has an identifying pin which engages into a corresponding bore on the rotary body.

In order to make it possible to change the established rotary position of the sensing pin carrier without great expenditure of time, it is favorable if the stopping device fixing the rotary position is detachable, the stopping device fixing the rotary position is detachable.

In a preferred embodiment the stopping device has for this purpose a swingable stop lever, on which a groove formed by two cylindrical bodies, parallel to the axis of rotation of the sensing pin carrier is present, which corresponds to a ball cup on the turnable part, i.e. the sensing pin carrier or the rotary body, in which system the rotary part has further ball caps on the circumference allocated to individual sensing pins. In order to compensate for the tilting moment applied in this manner to the axis of the sensing pin carrier or of the rotary body, the stopping device can have at least two components arranged substantially opposite one another with respect to the sensing pin carrier or the rotary body.

In the preferred form of execution the stopping device has further lever without groove, which lies diametrically opposite the stop lever essentially and is in engagement with another ball cup, which lies essentially diametrically opposite the first ball cup. The radial forces thus applied to the turnable part cancel each other out, so that no resulting moment on the axis of rotation arises.

Since the sensing pin is to be springily borne with respect to the workpiece, in a preferred embodiment the spring element provided for this is a parallel leaf spring pair, which is fastened at its one end to the measuring head and which carriers on its free end elastically to the measuring head a receiving body on which the sensing pin carrier is turnably borne.

This leaf spring pair enables the sensing pin to be deflected springily only in one direction. In the event that the sensing pin is to be springily deflected in another direction, then the bearing of said leaf spring pair is to be provided in an intermediate member which can spring in the further deflection direction over a second leaf spring pair. Over a third leaf spring pair there can also occur a cardan suspension of the sensing pin.

The springy bearing of the receiving body makes it possible to achieve the springing of the sensing pins simply, since it is not necessary for each sensing pin to be separately springily borne.

A deflection of the sensing pin on the workpiece brings about a magnitude to be measured. In order to detect this simply, it is advantageous if the measuring element has at least one inductive path recorder which connects the spring element and the measuring head in the direction of the spring path.

In the above-described bearing with several leaf spring pairs, there is to be provided a separate path recorder correspondingly for each springing direction.

Besides an inductive path recorder it is also possible in the scope of the invention to use incremental measuring systems or to provide the leaf springs with extension-measuring springs and with these to determine the deflection of the sensing pin.

In order to make it possible largely to automate the measurement of a workpiece, it is advantageous if the sensing pin carrier is turnable by a motor. In order to achieve an exact turning, the sensing pin carrier and the motor can be joined with an angle coder on the sensing pin carrier and a tacho-generator on the motor in a regulating circuit.

On the one hand it is possible, to be sure, to fasten the motor directly to the shaft of the sensing pin carrier or of the rotary body, but thereby the inert mass of the spring part is strongly increased. It is advantageous, accordingly, if the motor presents on its offdrive shaft a wheel which, over a turning rim coaxially joined torsionally fast with the sensing pin carrier, brings about the rotary movement of the sensing pin carrier. Since here a turning speed and rotary angle reduction can take place, it is possible to use a more economical motor.

In a preferred embodiment the motor is rigidly fastened to the measuring head and the rotary rim of the sensing pin carrier is brought into active connection with the wheel on the motor by deflection of the springly borne receiving body in which the sensing pin carrier is borne. The deflection of the receiving body can occur especially simply by a setting device fastened to the measuring head, in which case there is yielded the constructive free space to fasten the setting device at any arbitrary place in the measuring head when it deflects the receiving body over a rocker arm borne turnably on the measuring head.

Further features and advantages of the invention are yielded from the following description of the drawing. In this:

BRIEF DESCRIPTION OF THE DRAWINGS

FIG. 3 is a sectional view through a measuring head according to the invention.

FIG. 4 is a sectional view through FIG. 3 along the line IV—IV.

FIG. 5 is a sectional view through FIG. 3 along the line V—V.

FIG. 1 shows the overall view of a measuring arrangement according to the invention. On a stand 1 there are seated on a covered longitudinal guide 2 two tailstocks 3, 4, in which arrangement tailstock 3 is fixed and tailstock 4 is movable on the longitudinal guide 2 along the coordinate W. Between the tail spindles 5, 6 of the tailstocks 3, 4 a workpiece can be turnably clamped (see arrow C).

Figure 1:
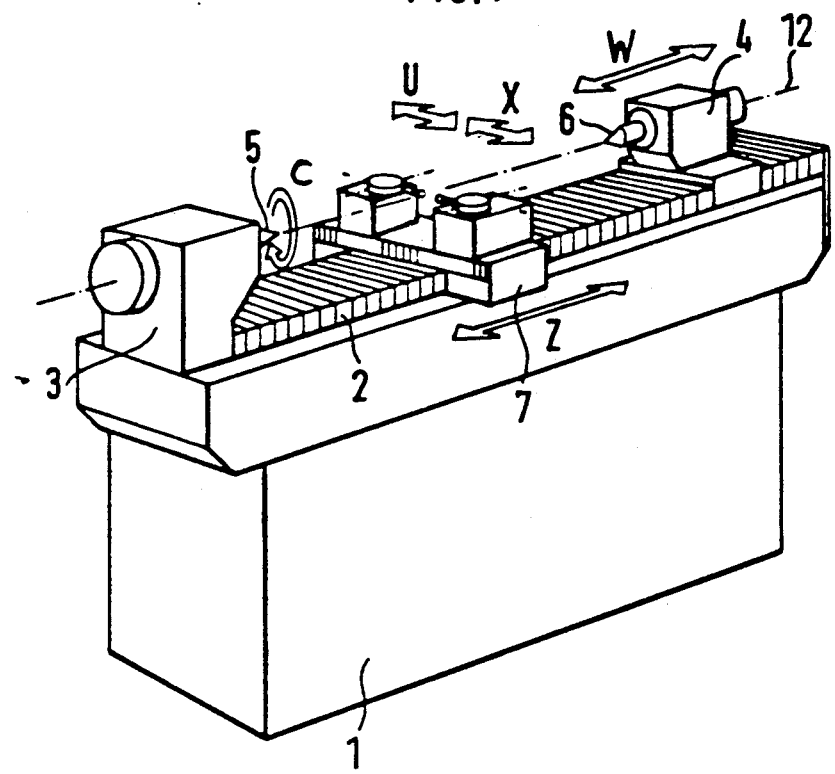
FIG. 1 shows an overall view of the measuring arrangement.
Figure 2:
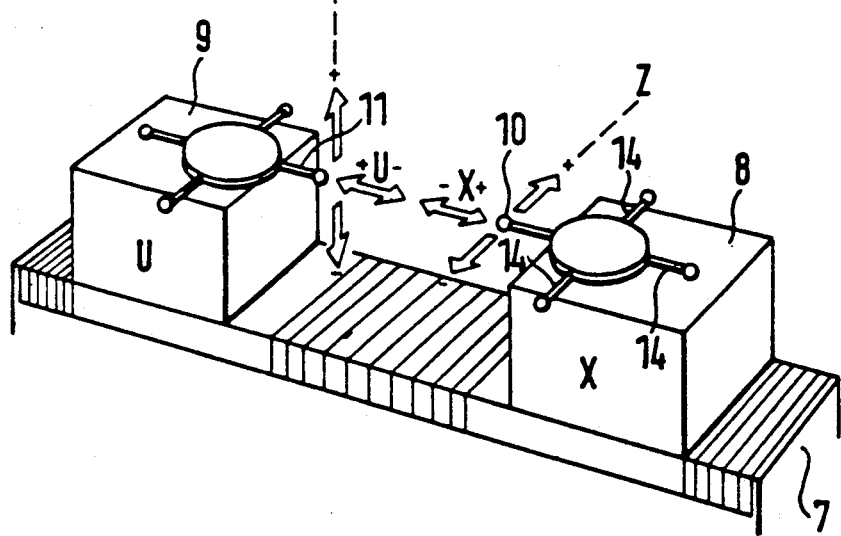
FIG. 2 depicts a measuring slide having two measuring heads.

Likewise, however, there can also be provided an overhanging bearing of the workpiece on one of the tailstocks. Between the tailstocks 3, 4 a measuring slide 7 can travel on the workpiece clamped between the tail spindles 5, 6 along the coordinate Z. The transverse guide 7, represented in detail in FIG. 2, carries two measuring heads 8, 9, which can be moved independently of one another on the measuring slide 7 along the coordinates U, X.

There the measuring heads scan with their sensing pins 10, 11 the contour of a workpiece that is clamped between the tail spindles 5, 6 of the tailstocks 3, 4.

From deviations of the sensing pins 10, 11 in the U or X direction the diameter of the workpiece is determined and if this is off-center to the workpiece longitudinal axis 12 the amount of the rotation error in the turning workpiece may be measured.

FIG. 3 depicts more precisely the construction of a measuring head. The sensing pin 10 is fastened in a sensing pin carrier 13 which presents still further sensing pins 14. In the example represented four sensing pins are mounted in the sensing pin carrier 13, but there can however be correspondingly more or fewer. The sensing pin carrier 13 is clamped with a clamping screw 15 onto a rotating body 16.

So that the relative position between sensing pin carrier and rotating body is clearly determined, in the underside of the sensing pin 13 there are integrated three ball cups 17.

In the emplacing of the sensing pin carrier 13 on the rotating body 16, the ball cups 17 come to lie in grooves formed by cylinder pairs 18 on the rotating body 16. In order to clearly establish the angular position of the sensing pin carrier to the rotating body, the sensing pin carrier 13 has an identifying pin 19, which engages into an identification bore 20 of the rotating body 16.

The rotating body 16 presents on its circumference several ball cups 21 to 24, which are required to establish the rotary body 16 in corresponding positions of rotation.

In FIG. 4 the stopping device is represented more precisely: In order to release the stopping device, the short-stroke cylinders 25 are driven out, whereby the stopping lever 26 and a further lever 27 are swung out about their fastening points 28 on the receiving body 29. In the process, two cylindrical bodies 30 which lie with their axes parallel to the axis of rotation of the rotating body 16 and thus form a groove, free the ball cups 21, so that the rotating body 16 can then be turned with the sensing pin carrier 13 seated on it.

In the desired end position of the sensing pin carrier or of the rotating body the short-stroke cylinders 25 are moved in again, whereby the stopping lever 26 and the oppositely lying other lever 27 are swung inward again over two restoring springs 31 and the groove formed by the cylindrical body 30 comes into engagement with another ball cup and thus exactly determines the rotary position of the rotating body 16. By the stopping lever 26 a radial force is exerted on the rotating body 16, which can lead to a tilt moment about the axis of rotation of the rotating body 16. In order to compensate this radial force, the other lever 27 presses with equal force over the ball cup 22 on the rotating body 16, so that all the radial forces are compensated.

The rotating body 16 is turnable over ball bearings 32 in a receiving body 29.

This receiving body 29, as represented in FIG. 5 is joined over two parallel leaf springs 33 with the carrier 43 rigidly fastened to the measuring head 8, 9. Over this leaf spring parallelogram 33 the receiving body 29, and therewith the rotating body 16 borne on it, is supported with stopping arrangements 25, 26, 27, 30, 31 and the sensing pin carrier 13 mounted on the rotating body 16 is supported with the sensing pins 10, 11 springly against the measuring heads 8, 9.

In the example represented, the spring support operates only in one direction, namely the radial direction. If the sensing pins 10, 11 are to be supported springly also in axial direction against the measuring heads 8, 9, then the carrier 43 is not fastened rigidly to the measuring heads 8, 9, but it is joined over a further leaf spring parallelogram with the measuring heads 8, 9. There, the leaf springs of this further leaf spring parallelogram run exactly transversely to the leaf springs 33 represented.

The sensing pin carrier is now turned as follows:

The short-stroke cylinders 25 travel outward. Therewith the levers 26, 27 swing outward and free the snapped-in ball cup 21 on the rotating body 16. A pneumatic cylinder 34 that is fastened to the measuring head 8, 9 then moves out and, over a tilt-lever 35 fastened to the measuring head, presses the receiving body 29 springly borne over the leaf springs 33 together with the rotating body 16 borne on the receiving body 29 to the side. Thereby the rotating body 16 with a friction rim 36 comes into force closure with a friction wheel 37 which is seated on a motor 38 fastened rigidly in the measuring head 8, 9.

The motor 38 with tachogenerator 39 is controlled in connection with a positioning control and the angle coder 40. When the motor 38, over the friction wheel 37 and the friction rim 36, has turned the rotary body 16 with the sensing pin carrier 13 into the desired position, the pneumatic cylinder 34 moves in again, whereby the tilt lever 35, drawn by the restoring spring 41, is swung back again and the receiving body 26 with the rotary body 16 springs back into the starting position, whereby rotary body and motor are again separated from one another.

Simultaneously the short-stroke cylinders 25 move in again, whereby the levers 26 and 27 again swing back by the restoring springs 31. In the process the cylinder bodies 30 lock the rotary position of the rotary body 16. Simultaneously, however, the lever 27 is pressed against the ball cup 22, so that the rotary body 16 is seated free of moment in the receiving body 29.

The recording of a measurement value occurs over an inductive path recorder 42. In a deflection of the sensing pin 10 with respect to the measuring head 8, 9, the sensing pin carrier 13, and over this the rotary body 16, is deflected, which transfers its deflection again directly onto the receiving body 29.

This deflection of the receiving body 29 is measured over the inductive path recorder 42 and correspondingly evaluated.

I claim:

1. Measuring arrangement for rotationally symmetrical workpieces with longitudinal guides running in the axial direction of the workpiece, on which guides a clamping device adjustable along the longitudinal guides carries the workpiece and on which a measuring slide is movable which carriers at least one measuring head measuring the workpiece with a sensing pin in a measuring direction, the measuring direction running radially and/or axially to the workpiece, wherein the measuring head is movable on the measuring slide transversely to the longitudinal guides and in which the sensing pin is coupled over a spring element onto the measuring head in such a manner that it is movable at least in the measuring direction with respect to the workpiece out of a basis position, in which on the sprung part there is fastened at least one measurement value indicator, with which the position change of the sensing pin is detectable, characterized in that the sensing pin (10, 11) is arranged in a sensing pin carrier which carries at least one other sensing pin (14), said sensing pin carrier being arranged to turn about an axis perpendicular to the workpiece axis (12) and in a plane which contains the workpiece axis, and that the sensing pin carrier is stoppable in each case in a rotary position allocated to the individual sensing pins by a stopping device.

2. Arrangement according to claim 1, characterized in that the sensing pin ca (13) is changeable joined with the measuring head (8, 9).

3. Arrangement according to claim 2, characterized in that the sensing pin carrier (13) is fastened with a clamping device (15) to a rotary body (16) which is turnable borne in the measuring head (8, 9).

4. Arrangement according to claim 3, characterized in that the rotary body (16) has a bearing (17, 18) which clearly determines the position of the fastened sensing pin carrier (13) with respect to the rotary body.

5. Arrangement according to claim 3, characterized in that the stopping device (21-24, 30) which fixes the rotary position of the sensing pin carrier (13) is releasable.

6. Arrangement according to claim 5, characterized in that the stopping device (21-24, 30) has at least two components (26, 27) arranged substantially opposite on another with respect to the sensing pin carrier.

7. Arrangement according to claim 5, characterized in that the stopping device has a swingable stop lever (26) with a groove formed by two cylindrical bodies (30), parallel to the axis of rotation of the sensing pin carrier (13) and a ball cup (21) corresponding to this groove on the rotary body (16), in which system the rotary body has further ball cups (22-24) allocated to individual sensing pins on the circumference.

8. Arrangement according to claims 7, characterized in that the stopping device has a further lever (27) without groove, which lies substantially diametrically opposite the stop lever (26) and is in engagement with another ball cup (22) which lies substantially diametrically opposite on the turnable part (16) of the first ball cup (21).

9. Arrangement according to claim 1, characterized in that the spring element is at least one parallel leaf spring pair (33) which is fastened at its one end to the measuring head (8, 9) and which carries on its free end elastically to the measuring head a receiving body (29) on which the sensing pin carrier (13) is turnably borne.

10. Arrangement according to claim 1, characterized in that the measuring element is at least one inductive path recorder (42) which connects the sprung part (29) and the measuring head (8, 9) in the direction of the spring path.

11. Arrangement according to claim 1, characterized in that the sensing pin carrier (13) is turnable by a motor (38).

12. Arrangement according to claim 11, characterized in that the sensing pin carrier (13) and the motor (38) are connected with an angle coder (40) on the sensing pin carrier (13) and a tachogenerator (39) on the motor in a regulating circuit.

13. Arrangement according to claim 11, characterized in that the motor (38) has on its offdrive shaft a wheel (37) which, over a rotary rim (36) coaxially joined, rigid to turning, with the sensing pin carrier (13), brings about the rotary movement of the sensing pin carrier.

14. Arrangement according to claim 1, characterized in that: the spring element is at least one parallel leaf spring pair (33) which is fastened at its one end to the measuring head (8, 9) and which carries on its free end elastically to the measuring head a receiving body (29) on which the sensing pin carrier (13) is turnably borne; the sensing pin carrier (13) is turnable by a motor (38); wherein the motor (38) has on its offdrive shaft a wheel (37) which, over a rotary rim (36) coaxially joined, rigid to turning, with the sensing pin carrier (13), brings about the rotary movement of the sensing pin carrier and that the motor (38) is rigidly fastened to the measuring head (8, 9) and that by deflecting of the springly borne receiving body (29) in which the sensing pin carrier (13) is borne the rotary rim (36) of the sensing pin carrier is bringable into active connection with the wheel (37) on the motor.

15. Arrangement according to claim 14, characterized in that the deflection of the receiving body (29) occurs through a setting member (34) rigidly fastened to the measuring head (8, 9), which setting member (34) deflects the receiving body over a tilt lever (35) turnably borne on the measuring head.

* * * * *